United States Patent [19]
Yanagawa

[11] 4,074,217
[45] Feb. 14, 1978

[54] CLEANING UNIT FOR AN OPTICAL SYSTEM IN A COPYING MACHINE

[75] Inventor: Nobuyuki Yanagawa, Chigasaki, Japan

[73] Assignee: Ricoh Company, Ltd., Japan

[21] Appl. No.: 688,333

[22] Filed: May 20, 1976

[30] Foreign Application Priority Data

May 21, 1975 Japan .............................. 50-68648[U]

[51] Int. Cl.² .................... G03B 27/52; G03B 27/00
[52] U.S. Cl. .................................. 355/30; 350/61; 355/1
[58] Field of Search ............... 355/3 R, 11, 45, 51, 355/49, 48, 50, 57, 60, 32, 35, 37, 1, 18, 30, 52, 8; 350/61, 63, 64

[56] References Cited

U.S. PATENT DOCUMENTS

| | | | |
|---|---|---|---|
| 2,461,668 | 2/1949 | Thompson | 355/30 |
| 3,175,481 | 3/1965 | Lahr | 355/1 |
| 3,402,418 | 9/1968 | Le Roy | 350/61 UX |
| 3,438,706 | 4/1969 | Tanaka et al. | 355/8 |
| 3,771,866 | 11/1973 | Ogawa | 355/8 |
| 3,977,781 | 8/1976 | Eppe et al. | 355/18 |

*Primary Examiner*—Donald A. Griffin
*Attorney, Agent, or Firm*—McGlew and Tuttle

[57] ABSTRACT

A cleaning unit for an optical system of slit exposure type is provided for a copying machine in which either an original receptacle or the optical system is movable in reciprocal motion for scanning an original on the receptacle to be copied. By utilizing the relative movement of the receptacle and the optical system, a lens face or other faces of the optical system which are to be maintained cleaned are automatically wiped by means of a soft material each time the scanning takes place.

8 Claims, 6 Drawing Figures

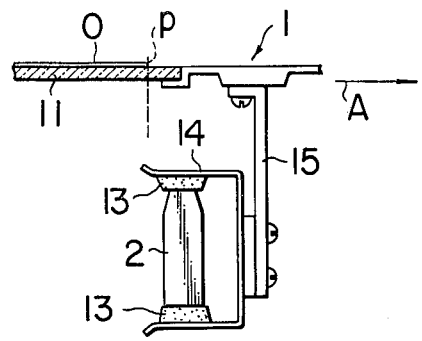
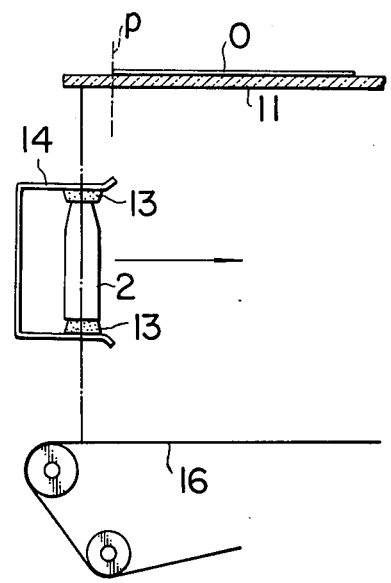
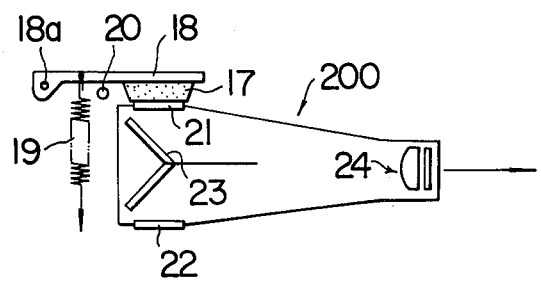

CLEANING UNIT FOR AN OPTICAL SYSTEM IN A COPYING MACHINE

BACKGROUND OF THE INVENTION

1. Field of the Invention

The invention relates in general to a cleaning unit for an optical system of an electronic copying machine and, in particular to a cleaning device using a cleaning pad movable across the optical surfaces of a copy machine.

2. Description of the Prior Art

When the surface of a light transmitting member included in an optical system used for the purpose of exposure in an electronic copying machine is contaminated by fines or dust floating in the air, a proper exposure of a photosensitive member may be impaired. The reduction in the transmitted light will cause a degradation in the image quality of the copy obtained. Frequently, such contamination is caused by fines contained in the environmental atmosphere which is drawin into the system when the lamp, which is used as a light source for illuminating an original, has cooled. In particular, with a system which developes an electrostatic latent image with a toner powder, an increased quantity of toner dust remains floating within the system, causing a considerable increase in contamination. There has been no positive approach to the removal of such contamination, and it has been often necessary to disassemble part of the copying machine to permit a necessary cleaning operation.

SUMMARY OF THE INVENTION

It is an object of the invention to provide a cleaning unit capable of positively cleaning the surface of selected members contained in an optical exposure system which are particularly susceptible to contamination. A further object is to effectively prevent deposition of fines or dust onto the optical surface.

A further object of the invention is to provide a cleaning unit which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference should be had to the accompanying drawing and descriptive matter in which there is illustrated a preferred embodiment of the invention.

BRIEF DESCRIPTION OF THE DRAWINGS

FIG. 4 is a side elevation of another embodiment of the invention;

FIG. 5 is a side elevation of a further embodiment of the invention; and

FIG. 6 is a side elevation of an additional embodiment of the invention.

GENERAL DESCRIPTION OF THE PREFERRED EMBODIMENT

Figure 1:
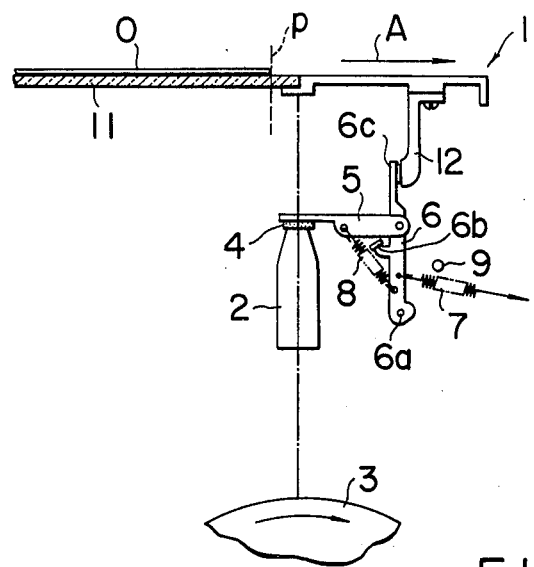
FIG. 1 is a side elevation of one embodiment of the invention.

Referring to the drawings in particular, the invention embodied therein comprises, in FIG. 1, an original receptacle, movable support or carriage 1, below which an imaging element or light transmissive member 2 is disposed which constitutes an optical exposure system. A photosensitive member in the form of a drum 3 is partly shown at a position directly below the imaging element or light transmissive member and is adapted to be rotated in a direction indicated by an arrow. As shown in FIG. 2, the imaging element or light transmission member 2 comprises a closely packed assembly of a plurality of focusing light transmitting members 2-1, 2-2, ... 2-i, ... of a uniform configuration, cut to a length which enables an erect image to be focussed with a magnification of unity and disposed in parallel and juxtaposed relationship with each other in the maximum possible density. The opposite ends of the light transmitting members are aligned so that they collectively form an elongated slit-shaped end face, extending along the direction of alignment of the individual members. The lengthwise direction of the light transmitting members constitutes the optical axis, and the imaging element is fixedly mounted at a position which is just midway between an original surface and the surface of the photosensitive member 3. The exposure of the photosensitive member 3 takes place by utilizing a lamp, not shown, to illuminate the surface of an original O which faces the upper end face of the imaging element 2, over an elongated, slit-shaped area. The support or carriage 1 moves in the direction indicated by the arrow A and simultaneously conveys an original O placed on a receiving glass 11. The photosensitive member 3 is rotated in the direction of the arrow with an angular velocity corresponding to a peripheral speed equal to the speed of movement of the original O.

In the present embodiment, there is provided a cleaning unit which comprises a cleaning member or pad 4, a holder 5, a lever 6 and a stop arm 12. The unit functions to clean that surface of the imaging element or light transmissive member 2 which is most susceptible to contamination, namely, the upper end face thereof. The cleaning member 4 conforms to the configuration of the end face of the imaging element 2 being made of a soft resilient material such as felt or sponge. The pad or cleaning member 4 is of sufficient thickness so that its rubbing action against the surface of the element 2 does not result in damage to the end faces of the individual light transmitting members. The cleaning member or pad 4 is mounted on the free end of the holder 5 and normally covers the upper surface of the imaging element or light transmissive member 2 when the machine is not in its exposure mode. The opposite end of the holder 5 is pivotally mounted on the lever 6, which is in turn rockably mounted on a pin 6a secured to a stationary member. A compression spring 7 extends between the lever 6 and another stationary member, whereby the lever 6 is normally urged to rotate clockwise, as shown in FIG. 1, but such clockwise movement is limited during the non-exposure mode by the abutment of a free end 6c of the lever 6 against the stop 12 which is fixedly mounted on the original receptacle support or carriage 1.

Figure 2:
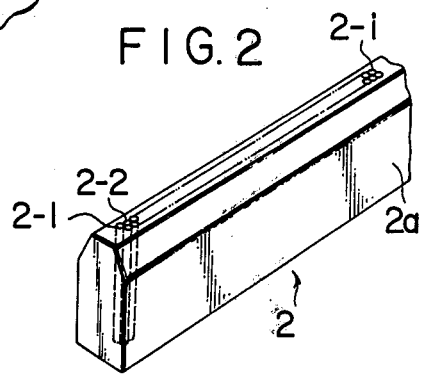
FIG. 2 is a fragmentary perspective view of an imaging element used in the apparatus shown in FIG. 1.

Another compression spring 8 extends between the holder 5 and the lever 6, whereby the holder 5 is normally urged to rotate counterclockwise as shown in FIG. 1. This rotation is limited by the abutment of the cleaning member 4 against the upper end face of the imaging element 2. The lever 6 has a holder stop piece 6b integrally formed thereon which is adapted to engage the holder 5 as mentioned below.

Figure 3:
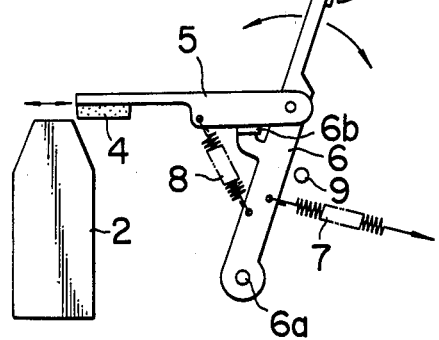
FIG. 3 is a schematic view illustrating a cleaning operation which is conducted in the embodiment shown in FIG. 1.

In FIG. 1, a dotted line P indicates the end of an effective copying surface on the receiving glass 11. When the photosensitive member 3 is subjected to exposure, the original receptacle support 1 is moved in the direction indicated by the arrow A. Thereupon, the stop 12 also moves in the same direction as shown in FIG. 3, so that the lever 6 begins to rotate clockwise under the action of the spring 7. Such rotation results in a movement of the pivotal connection between the holder 5 and the lever 6, resulting in a similar movement of the cleaning member or pad. Since the holder 5 is biased to rotate counterclockwise, the cleaning member 4 rubs against the upper end face of the imaging element or light transmissive member 2 as it moves to the right, as shown in FIG. 3. The abutment piece or holder stop 6b is positioned and shaped so that the angular movement of the holder 5 is blocked at the moment the cleaning member 4 clears the upper end face of the imaging element 2. After engagement with the holder stop 6b, the holder 5 continues to rotate clockwise together with the lever 6 until the clockwise rotation of the latter is prevented by abutment against a pin 9. Under this condition, the light path extending from the surface of an original to the photosensitive member 3 is completely cleared allowing the exposure of the photosensitive member 3. Upon completion of the exposure, the original receptacle or support 1 is moved in the opposite direction, whereby the stop 12 moves in a direction indicated by an arrow B to bear against the free end 6c of the lever 6 again, rotating it counterclockwise to the position shown in FIG. 1 against the resilience of the spring 7. As a result of such rotation, a movement of the cleaning member 4 takes place in the opposite manner from that mentioned above, returning it to the position shown in FIG. 1 in which it covers the upper end face of the imaging element 2 again. During such movement, it will be appreciated that the cleaning member 4 rubs the upper end face again, thus wiping off any fines which may have been deposited thereon during the exposure operation. Since the upper end face of the imaging element is covered by the cleaning member 4 during the non-exposure mode of the machine, a deposition of fines onto the end face is completely prevented.

Other embodiments of the invention are shown in FIGS. 4 to 6. For brevity of description, parts described above in connection with the embodiment shown in FIGS. 1 to 3 will be designated by like numerals as before.

FIG. 4 shows a cleaning unit which cleans the lower end face as well as the upper end face of the imaging element or light transmissive member 2. In this instance, a pair of cleaning pads or members 13 are shaped in conformity with the configuration of the upper and lower end faces of the imaging element 2, and are fixedly mounted on the upper and lower arm portions of a channel-shaped holder 14, which is carried by a bar 15 fixedly mounted on the original receptacle support or carriage 1 for integral movement therewith. It will be understood that during such movement, the cleaning members 13 rubs the respective end faces of the imaging element 2 for the purpose of cleaning as long as they are in contact therewith. To provide an effective rubbing effect, it is preferred that the holder 14 be shaped in such a way as to cause the cleaning members 13 to be gently pressed against the respective end faces during the time they are in contact therewith. When the holder 14 is shaped in this manner, both the limbs or arms of the holder 14 will be slightly forced apart by the imaging element 2 as the cleaning members 13 begin to engage the latter subsequent to the completion of an exposure operation. The engagement between the cleaning members and the imaging element 2 may be facilitated by flaring or beveling the opposite ends of the holder 14 outwardly. It is only necessary that the cleaning members 13 be moved out of the exposure light path during the exposure operation, and any conventional means may be used to move the cleaning unit. Stated more generally, it is only necessary for a cleaning member or members of the cleaning unit and an element of an exposure optical system having a surface to be cleaned, to be movable relative to each other in a rubbing manner and be sufficiently separable for the cleaning unit to completely clear the exposure light path. Thus, in a arrangement as shown in FIG. 5 in which an original O and an exposure surface of a photosensitive member 16 are dispose in parallel relationship and remain stationary while an illumination lamp, not shown, a charger, not shown, and the imaging element or light transmissive members 2 are intergrally moved in a direction indicated by an arrow to provide an exposure, the cleaning unit may be mounted at a given position, that is, a position in which cleaning members 13 cover the upper and lower end faces of the imaging element 2 at the time the latter assumes a start position.

FIG. 6 shows another form of cleaning unit for a different type of slitwise exposure system. In this instance, an exposure system 200 comprises a housing provided with a pair of dust protective glasses 21, 22 and contains a reflecting mirror 23 and an in-mirror-lens 24 disposed at given positions. The optical system is adapted to reciprocate, and provides exposure of a photosensitive member, not shown, while it moves in a direction indicated by an arrow. In this arrangement, the cleaning unit should be capable of cleaning the surface of the dust protective glass 21 which is susceptible to contamination by fines. Specifically, the unit comprises a cleaning member 17 disposed and shaped to cover the dust protective glass 21, a holder 18 which is pivotally mounted on a pin 18a at its one end and carrying the cleaning member 17 on its free end, a compression spring 19 extending between the holder 18 and a stationary member for biasing the holder 18 to rotate clockwise, and a stop pin 20 for preventing a further rotation of the holder 18 after the dust protective glass has cleared the cleaning member 17. The function of the cleaning unit is similar to that described previously.

It should be understood that the cleaning member or members may be impregnated with a suitable agent which improves the intended cleaning effect.

While a specific embodiment of the invention has been shown and described in detail to illustrate the application of the principles of the invention, it will be understood that the invention may be embodied otherwise without departing from such principles.

What is claimed is:

1. A device for cleaning an exposed part, such as a lens, in an optical system of a photocopier, comprising a movable support for an original sheet to be copied, a light transmissive member having at least one exposed surface disposed adjacent said support, a cleaning member engageable over said exposed surface, and means connected between said support and said cleaning member for moving said cleaning member off said exposed surface when said support is moved to a position to expose the original to the light transmissive member during copying.

2. A device according to claim 1, wherein said moving means further comprises a holder connected to said cleaning means, a lever pivotally mounted to a portion of said photocopier and having said holder pivotally mounted thereon, and spring means between said holder and said lever for biasing said cleaning means against said exposed surface.

3. A device according to claim 2, wherein said moving means further comprises a stop connected to said lever adjacent said holder for limiting the motion of said holder when said cleaning means is moved out of engagement with said exposed surface, spring means between said lever and a fixed portion of said photocopier for biasing said lever with said holder and cleaning means, away from said exposed surface, a lever stop connected to said support for holding said lever toward said exposed surface against the bias of said last mentioned spring means, and a pin fixed in said photocopier adjacent said lever for limiting the motion of said lever through said last mentioned spring means when said lever stop moves away from said lever.

4. A device according to claim 1, wherein said moving means further comprises a channel-shaped holder connected movably to said support adjacent said cleaning means having at least one arm portion connected to said cleaning means and biasing said cleaning means toward said exposed surface.

5. A device according to claim 1, wherein said cleaning means further comprises a channel-shaped holder connected to a portion of said photocopier having at least one arm portion adjacent said exposed surface, a cleaning pad connected to said arm portion engageable over said exposed surface, said arm biasing said pad toward said exposed surface, and said light transmissive means movable away from said cleaning means for taking said pad out of engagement with said exposed surface.

6. In a cleaning unit for an optical system in a copying machine comprising means movable in reciprocal motion along a predetermined path for scanning an original to be copied through said optical system, the improvement comprising a. a mechanical wiper means arranged to be automatically brought into light pressing contact with at least one face to be cleaned of said optical system when said movable means arrives at a position corresponding to one of the extremities of said path, and b. means for moving said wiper means relative to and along said face while maintaining the light pressing contact thereon until said wiper means stands aside off said faces when said movable means departs from said position for scanning.

7. A unit according to claim 6, wherein said movable means comprises an original receptacle and wherein said moving means comprises means for fixing said wiper means to said receptacle.

8. A unit according to claim 6, wherein said movable means comprises means for moving said optical system for scanning and wherein the first mentioned moving means comprises means for maintaining said wiper means stationary.

* * * * *